United States Patent Office 3,214,439
Patented Oct. 26, 1965

3,214,439
REACTION PRODUCTS OF MITOMYCINS
Donna Bernice Cosulich, Pearl River, James Burns Patrick, Suffern, and Richard Preston Williams, Tomkins Cove, N.Y., assignors to American Cyanamid Company, Stamford, Conn., a corporation of Maine
No Drawing. Filed Nov. 2, 1964, Ser. No. 408,313
2 Claims. (Cl. 260—319)

This application is a continuation-in-part of our copending application Serial No. 250,027 filed January 8, 1963, now abandoned, which in turn is a continuation-in-part of application Serial No. 49,176 filed August 12, 1960.

This invention relates to a novel group of antibiotics and, more particularly, is concerned with a novel series of active antibacterial agents derived by reaction of certain of the mitomycin group of antibiotics with certain aliphatic aldehydes.

Certain of the starting materials for the preparation of the novel compounds of this invention are in themselves novel antibiotics produced by cultivation of appropriate strains of *Streptomyces verticillatus* ATCC Nos. 13,495, 13,538 and 13,539. These novel elaboration products, formerly designated $\beta$, $\gamma_1$ and $\gamma_2$, are now known, respectively, as mitomycin A, mitomycin B and porfiromycin. Structure elucidation of mitomycins A, B and C and porfiromycin is described by J. S. Webb et al. in J.A.C.S., 84, 3185 (1962).

Another class of suitable starting materials for the preparation of the novel products of this invention are the N-substituted derivatives of mitomycin A and mitomycin C which form the subject matter of the copending application of Meyer et al., Serial No. 200,631 filed June 7, 1962.

For convenience, the structures of the mitomycins and porfiromycin referred to above are reproduced below.

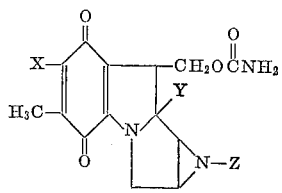

| Compound | X | Y | Z |
|---|---|---|---|
| Mitomycin A | H$_3$CO | OCH$_3$ | H |
| Mitomycin B | H$_3$CO | OH | CH$_3$ |
| Mitomycin C | H$_2$N | OCH$_3$ | H |
| Porfiromycin | H$_2$N | OCH$_3$ | CH$_3$ |

The N-substituted derivatives of mitomycin A and mitomycin C may be represented by the following general formula:

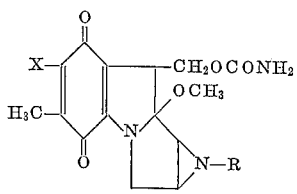

wherein X is lower alkoxy or amino; and R is lower alkyl, lower alkanoyl, phenyl lower alkyl, benzoyl, phenyl carbamoyl, lower alkyl sulfonyl, phenyl sulfonyl and lower carboalkoxy.

In accordance with the present invention we have discovered that it is possible to prepare highly useful antibacterial agents by reaction of the foregoing groups of antibiotics with lower aliphatic aldehydes.

The novel antibiotics of this invention are, in general, colored crystalline solids of relatively limited solubility in water, but somewhat more soluble in lower alkanols, ethyl acetate, acetone, toluene, benzene, chloro-form, and the like.

The aldehydes which are useful are lower aliphatic aldehydes such as acetaldehyde and its homologs.

The structures of the reaction products of the five starting antibiotics with the aliphatic aldehydes are unknown at the present, and accordingly, these products are defined as the reaction products of the aliphatic aldehydes with mitomycin A, mitomycin B, mitomycin C, porfiromycin, and N-substituted derivatives of mitomycin A and mitomycin C. These starting materials may be represented by the following general formula:

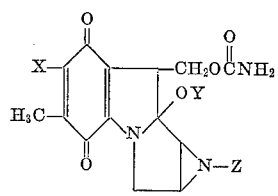

wherein X is amino or lower alkoxy, Y is hydrogen or methyl, and Z is hydrogen, lower alkyl, lower alkanoyl, phenyl lower alkyl, benzoyl, phenyl carbamoyl, lower alkyl sulfonyl, phenyl sulfonyl, and lower carboalkoxy.

It is an advantage of this invention that the novel reaction products may be prepared for the most part in simple reaction media. Ordinarily water is used as a reaction medium, but other liquids such as lower alkanols, ethyl acetate, benzene, toluene, chloroform, or the like can be used.

Typically, the starting material is dissolved in a suitable volume of water, and any excess of aliphatic aldehyde either alone or dissolved in water or other suitable solvent is added with stirring. Very often the progress of the reaction is accompanied by a visible color change or a shift in the ultra violet absorption spectrum. In general, after the reaction is completed or largely completed, the reaction medium and excess reactant may be removed by vacuum distillation, and the product may then be recovered by conventional means such as crystallization, chromatography, and the like. The novel antibiotics of this invention and the starting antibiotics are sensitive to acid and to high temperatures, and in consequence, care must be taken to avoid their exposure to these two conditions. When distillation is employed, for example, to remove reaction medium and excess reactant, a high enough vacuum should be maintained to keep the temperature low.

It is thought likely from the behavior of the novel antibiotics of this invention that for the most part the reaction product of a single starting antibiotic and a single aliphatic aldehyde will be a single compound. Rigorous proof of this fact, however, has not always been possible, and it might be that in some instances mixtures of products result.

The novel antibiotics of this invention have broad-spectrum activity against a number of microorganisms and thus are useful antibacterial agents. The new antibiotics show in vitro activity in standard, scientifically recognized microbiological assays, against the following organisms:

*Klebsiella pneumoniae* "A" strain AD
*Bacillus cereus* ATCC 10702
*Mycobacterium smegmatis* ATCC 607
*Streptococcus pyogenes* $\beta$ hemolytic

*Escherichia coli* ATCC 9637
*Salmonella gallinarum*
*Staphylococcus aureus* ATCC 6538
*Pseudomonas aeruginosa* ATCC 10145
*Streptococcus faecalis*
*Staphylococcus albus* No. 69
Streptococcus sp. β hemolytic No. 80
*Staphylococcus aureus* NY 104
*Corynebacterium xerose*
Streptococcus sp. α hemolytic
*Escherichia coli* No. 22
*Bacillus subtilis* ATCC 6633
*Alcaligenes faecalis* ATCC 10153
*Proteus vulgaris* ATCC 9484
*Sarcina lutea* ATCC 9341

The novel antibiotics of this invention are active against gram-positive and gram-negative microorganisms, such as, staphylococci, pneumococci, and streptococci. The novel compounds are thus potentially useful as therapeutic agents in treating bacterial infections in humans and animals caused by such microorganisms. The compounds can be usefully employed for controlling such infections by topical application or internal administration.

The usefulness of the novel compounds is demonstrated by their ability to control systemic lethal infections in mice. Thus the novel antibiotics of this invention show very high antibacterial in vivo activity in mice against *Staphylococcus aureus*, strain Smith, ranging by direct comparisons from about ½ to about 8 times the activity of tetracycline. Although the novel antibiotics of this invention have not as yet been clinically demonstrated to be useful in human therapy, the conditions of the tests in mice against human pathogens show a high probability of useful activity in humans.

The invention will be described in greater detail in conjunction with the following specific examples.

Example 1

1.5 parts of mitomycin A are dissolved in 1,000 parts of water and 100 parts of acetaldehyde added with shaking. The purple solution which is the characteristic color of mitomycin A gradually changes color to orange. When the reaction is complete, the reaction mixture is frozen and dried in the frozen state, resulting in an orange oil which contains the crude antibiotic with the excess unreacted acetaldehyde. The crude antibiotic is then separated by chromatography using a diatomaceous earth packed column and a system consisting of 1 part heptane, 4 parts ethyl acetate, 3 parts methanol and 2 parts water.

The first fraction from the column is then rechromatographed and orange crystals of the new antibiotic are obtained. When dissolved in methanol, the following absorption bands are noted:

U.V. $\lambda_{max.}^{MeOH}$ 232, 286, (335), (440)

The antibiotic when examined by chromatography in a system containing 200 parts of benzene, 50 parts of isoamyl alcohol and 100 parts of water showed an $R_f$ of 0.78. This compares with the $R_f$ of 0.72 of the starting material under the same conditions.

What is claimed is:

1. The product of the reaction of a lower alkanal with a compound of the formula:

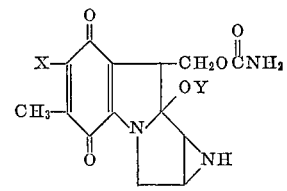

wherein X is selected from the group consisting of amino and lower alkoxy; and Y is selected from the group consisting of hydrogen and methyl; said reaction being carried out in a non-acidic solvent inert to the reactants at a temperature of from about 0° C. to about 30° C.

2. The product of the reaction of acetaldehyde with mitomycin A, said reaction being carried out in a non-acidic solvent inert to the reactants at a temperature of from about 0° C. to about 30° C.

No references cited.

NICHOLAS S. RIZZO, *Primary Examiner.*